United States Patent [19]

Siekman et al.

[11] Patent Number: 4,734,811
[45] Date of Patent: Mar. 29, 1988

[54] MAGNETIC TRANSDUCING HEAD

[75] Inventors: Jakob G. Siekman, Son; Johann R. P. N. Crüts, Eindhoven, both of Netherlands

[73] Assignee: U.S. Philips Corp., New York, N.Y.

[21] Appl. No.: 849,226

[22] Filed: Apr. 7, 1986

[30] Foreign Application Priority Data

Apr. 19, 1985 [NL] Netherlands ............... 8501144

[51] Int. Cl.$^4$ .............................................. G11B 5/17
[52] U.S. Cl. ........................................................ 360/123
[58] Field of Search ................................. 360/123, 126

[56] References Cited

U.S. PATENT DOCUMENTS 3,662,119  5/1972  Romankiw .................. 360/123 X
3,731,005  5/1973  Shearman ...................... 360/123
3,881,194  4/1975  Heaslett ........................ 360/123
4,323,941  4/1982  Lazarri ......................... 360/123

Primary Examiner—A. J. Heinz
Attorney, Agent, or Firm—F. Brice Faller

[57] ABSTRACT

Magnetic transducing head, comprising a core of magnetizable material having two slightly spaced limbs defining a transducing gap between them, a bundle of insulated wires of electrically conducting material running parallel to the transducing gap being bonded both to the inside and to the outside of at least one core limb, the ends of the wires of different bundles located on the same side of the core limb being connected together by means of connection wires in such a manner that a plurality of electrical turns is formed.

6 Claims, 12 Drawing Figures

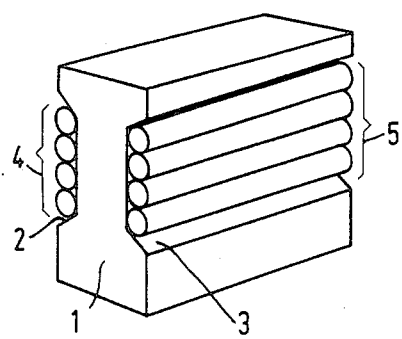
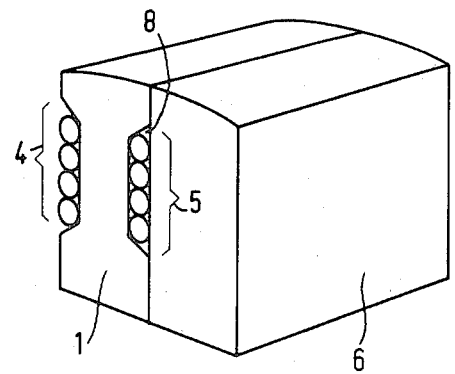
FIG.1  FIG.2
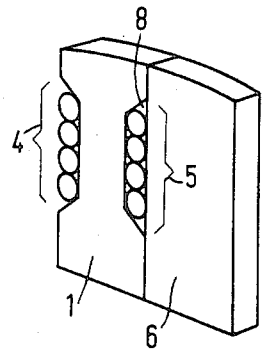
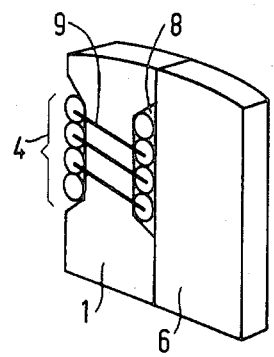
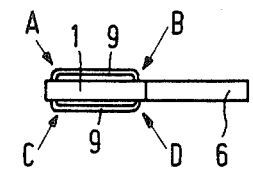
FIG.3  FIG.4  FIG.5
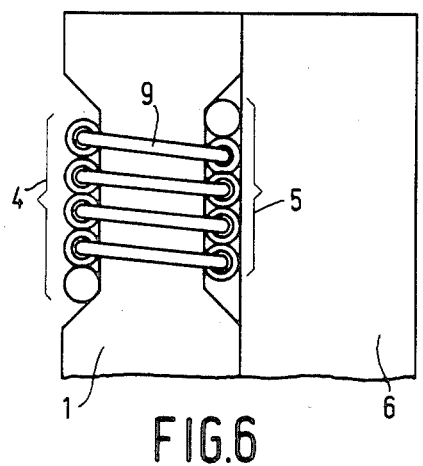
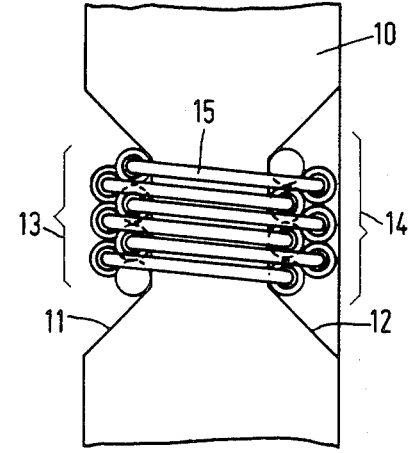
FIG.6  FIG.7

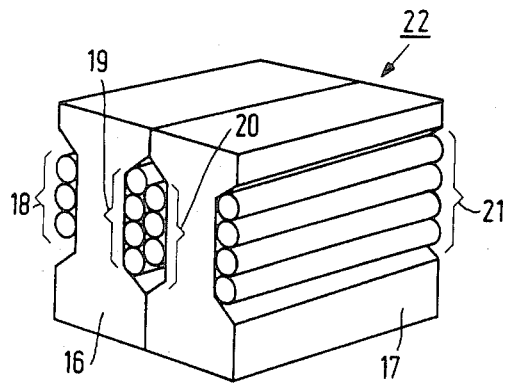
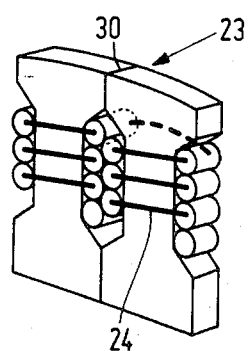
FIG.8　　FIG.9
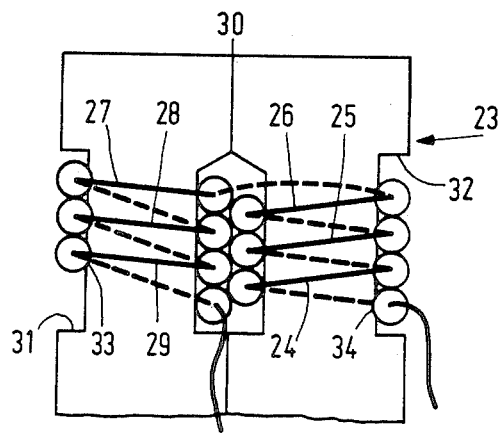
FIG.10
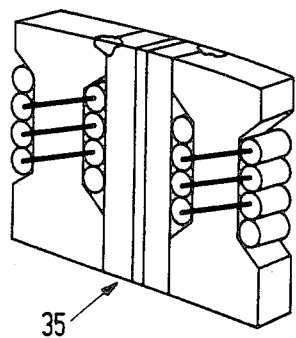
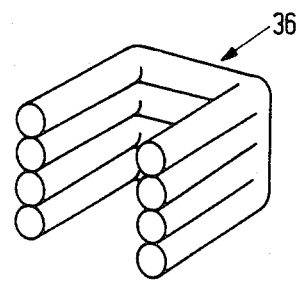
FIG.11　　FIG.12

MAGNETIC TRANSDUCING HEAD

BACKGROUND OF THE INVENTION

The invention relates to a magnetic transducing head, comprising a core of magnetisable material having two slightly spaced limbs defining a transducing gap between them, a plurality of electrical turns being provided around part of the core.

Magnetic recording systems are well known and their use is increasing tremendously with the growth of different technologies, particularly those relating to computer and video uses. The conventional systems for data storage nowadays use a magnetic medium of one kind or another. The medium may have the shape of a magnetic disc, drum or tape or any other magnetic element which is capable of receiving and storing data with a high density in a small volume. Whatever kind of magnetic medium is used, a magnetic transducing head will always be required to pass information to the medium and to retrieve this information whenever necessary. A variety of magnetic transducing heads have been developed in parallel with the development of magnetic storage systems. Virtually all these heads satisfy a basic concept in that each head is provided with a core of magnetisable material having two slightly spaced limbs defining a transducing gap between them, whilst a plurality of electrical turns is provided around at least one of the limbs. In this inductive head type the turns are required for recording signals on the magnetic medium or for the retrieval of signals from the magnetic medium.

To achieve an increase of storage density on the recording media it is necessary to make the magnetic transducing heads increasingly smaller. In the current video heads the core consists of, for example, a slice of ferrite of $3 \times 3$ mm having a thickness of 200 microns. Such a slice has a small aperture (dimension 0.3 mm $\times$ 0.5 mm), which is commonly referred to as the winding aperture. A thin insulated copper wire (thickness 30 to 50 microns) is threaded through this aperture to form the coil turns. Threading, which is still frequently done manually, is a time-consuming activity which also involves the risk of damage to the fragile core or thread. This risk will become even greater in view of the tendency towards increasingly smaller dimensions of the heads (for example, cores of 1 mm $\times$ 1 mm $\times$ 150 microns with winding apertures of 0.07 mm $\times$ 0.2 mm).

SUMMARY OF THE INVENTION

The invention provides a new coil configuration obviating the problems attendant on threading and providing in addition a more regular winding pattern. A bundle of insulated wires of electrically conducting material running parallel to the transducing gap is bonded to the inside of at least one core limb, and ends of the wires are connected together by means of connecting wires in such a manner that the turns are formed.

Threading is thus eliminated and is replaced by bonding connection wires to the front and rear sides of the core slices. Any wire connection technique known from IC manufacture (for example, ultrasonic bonding, laser bonding, resistance welding) is in principle suitable to connect the wire bundles in the winding apertures into coils.

The wire bundle may be provided in a number of different manners on the inside of a core limb in the winding aperture.

In one embodiment each wire lies in its own channel in order to ensure correct positioning of the wires of the wire bundle (which is important for automation of the bonding process).

Dependent on the number of turns required the wires of the bundle may lie on one or more layers, the wires of a subsequent layer lying between the wires of the preceding layer. Alternatively the turns may be spread over the two core limbs. A wire bundle is bonded only to the inside of a core limb so that the connection wires must partly encircle the relevant core limb.

The connection wires can be provided in a simpler manner when a wire bundle is bonded to both the inside and the outside of a core limb. In that case the connection wires always lie on the same side of the core limb. A bundle of insulated wires of electrically conducting material running parallel to the transducing gap is bonded both to the inside and to the outside of at least one core limb and the ends of the wires of different bundles located on the same side of the core limb are connected together by means of connection wires in such a manner that the turns are formed.

Configurations are referred to above having straight wire bundles bonded to the inside and the outside, respectively, of a core limb. These configurations may be the product of a bulk manufacturing method in which wire bundles are previously provided against the sides of large blocks, whereafter separate core slices are sawn from these blocks. Transducing heads according to the invention may also be manufactured by providing U-shaped bent wire beams or wire trees around separate core slices and completing coils by means of connection wires bonded to the ends of the wires in the beams. The latter method is notably suitable for use when the head cores consist of a metallic material.

BRIEF DESCRIPTION OF THE DRAWING

FIG. 1 shows a core block having longitudinal sides to which wire bundles are bonded, FIG. 2 shows a core block assembly consisting of the core block of FIG. 1 and an opposing block connected thereto, FIG. 3 shows a core slice sawn from the core block assembly of FIG. 2, FIG. 4 shows a core slice provided with connection wires, FIG. 5 shows the core slice of FIG. 4 in a crosssection, FIG. 6 is an elevation view on a larger scale of the coil of the core slice of FIG. 4, FIG. 7 is an elevation view of an alternative coil, FIG. 8 shows a core block assembly having two core blocks of FIG. 1, FIG. 9 shows a core slice from the block of FIG. 8 provided with connection wires, FIG. 10 is an elevation view of that of the core slice of FIG. 9, FIG. 11 is a perspective view of a double core slice, and FIG. 12 is a perspective view of a wire tree.

DETAILED DESCRIPTION OF THE PREFERRED EMBODIMENTS

In the conventional manufacture of video heads two ferrite blocks are bonded to what is commonly referred to as the "body" so that the "gap" is formed. One of the blocks has a ground-in channel, which later becomes the winding aperture. By sawing this body into slices of approximately 200 μm thickness and by threading a thin insulated copper wire (30–50 μm) through each winding aperture the video head is produced which may then be cut to "track width" with the aid of a laser.

A method which is safer and leads to a more regular winding pattern is the following.

A core block 1 with ground-in longitudinal channels 2, 3 is provided. A plurality (equal to the desired number of turns) of straight, insulated wires is strung in the channels 2, 3 and subsequently a bonding agent (for example, an epoxy resin or a glass) is allowed to flow in a capillary manner between these wires themselves and the walls of the channels, whereafter the bonding agent is cured. Core block 1 is thereby provided with wire bundles 4, 5 (FIG. 1) bonded thereto. Subsequently core block 1 formed into an assembly with the aid of an opposing block 6 (FIG. 2). This assembly is sawn into slices 7 having a thickness of, for example, 200 μm (FIG. 3).

Each slice 7 already has the "lead-throughs" in the winding aperture 8. Because of the larger bonding surface a greater strength between the core halves is obtained.

Conventional winding is thus reduced to ultrasonic or laser bonding of connection wires 9, etc. to the front and rear sides of the core slices 7 (FIG. 4). Making such connection is a known technique from IC manufacture. FIG. 5 is a cross-section of a core slice 7 thus obtained. The references A, B, C and D indicate the bonding areas of a turn. FIG. 6 shows the coil of the core slice 7 of FIG. 4 on a larger scale. The wire bundles 4, 5 consist of insulated wires having a thickness of 45 microns (35 microns of copper, 5 microns of insulation). The connection wires 9 are fixed to the ends of the wires of the wire bundles 4, 5 by means of ultrasonic bonding or laser bonding.

The lead-through wires and the connection wires may be made of copper, but aluminum is less expensive for this special technique and is technically slightly simpler. Copper has a thicker and tougher oxide film which can be removed by etching, whereas etching is not required in the case of aluminum.

Variations are possible such as no channel on the outside or only providing the wires for the inner lead-throughs so that the connection wires have to be provided around the head. It is also possible to make fine channels to satisfactorily position each separate wire in connection with automation of the manufacturing process.

FIG. 7 is an elevational view of a core block 10 which is provided with channels 11 and 12. Double-layer wire bundles 13 and 14 are bonded in the channels 11 and 12, respectively. The ends of the separate wire bundles are connected by means of connection wires 15 to the front and rear sides of core block 10 for forming a coil. The wire bundles are bonded first and subsequently the core block 1 and the opposing block 2 are united to form a core block assembly with the aid of a glass or synthetic resin adhesive such as an epoxy resin.

An alternative method is to provide a core block assembly by previously bonding the core blocks 1 and 6 with the aid of a high melting point glass. Subsequently the wire bundle 5 is inserted into the central aperture and bonded, with the aid of a glass having a lower melting point, and the wire bundle 4 is bonded to the outside.

The coil may alternatively be formed around the two core limbs instead of around one core limb, that is to say, each limb will have a pack of turns. As is shown in FIG. 8, it is then possible to start from an assembly 22 of two core blocks 16, 17 of the type shown in FIG. 1. Wire bundles 18 and 19 are bonded to the longitudinal sides of core block 16 and wire bundles 20 and 21 are bonded to the longitudinal sides of core block 17. Assembly 22 is sawn into thin slices 23. The ends of the wires of the wire bundles are connected together by means of connection wires 24 on the front and rear sides of core slice 23 for forming a coil whose turns on one core limb have a winding sense opposite to the winding sense of the turns on the other limb. All this is clarified in FIG. 10 which is an elevational view on a larger scale of part of the core slice 23 of FIG. 9. The advantage of distributing the turns on the two core limbs is that the pack of turns as such can be positioned more closely to the transducing gap 30 which contributes to the efficiency of the head.

FIG. 10 also shows how the longitudinal channels 31, 32 may be provided with sub-channels 33, 34 respectively to ensure that the wires of the wire bundles are located in predetermined positions.

The invention is also particularly suitable for a head having two transducing gaps and two separate windings. Such a head 35, which may be used in a digital video recorder (see UK-A No. 2,113,896), is shown in FIG. 11.

Referring to FIG. 12 is is also possible to use pre-formed U-shaped wire bundles 36; this is particularly advantageous if separate head cores are to be provided with turns. In this respect it is to be noted that the bulk-manufacturing method as shown in FIGS. 1–4 and in FIGS. 8,9 is most suitable when the material of the head cores is a ceramic material, such as Ni-Zn ferrite or Mn-Zn ferrite. When the material of the head cores is a metallic material, such as an Ni-Fe alloy, an Al-Fe-Si alloy or an amorphous metal, it may be desirable to provide the separate head cores with turns using U-shaped wire bundles of the type shown in FIG. 12.

What is claimed is:

1. A magnetic transducing head comprising
    two core limbs of magnetizable material, said limbs being spaced to form a transducing gap therebetween, each limb having an inside facing the inside of the other limb, an outside opposing the inside of the respective limb, and a pair of opposed lateral sides between said inside and said outside,
    a bundle of insulated wires bonded to the inside of at least one of said core limbs and extending between the opposed lateral sides thereof, each of said insulated wires having an end at one of said lateral sides,
    a bundle of insulated wires bonded to the outside of said at least one of said core limbs and extending between the opposed lateral sides thereof, each of said insulated wires having an end at said one of said lateral sides,
    connection wires extending across said one lateral side between respective ends, at said one lateral side, of wires in the bundle on the inside and wires in the bundle on the outside to complete the turns of a coil, whereby, wire bonding techniques known from integrated circuit technology may be used to connect the connection wires to wire ends in the bundles.

2. A magnetic transducing head as in claim 1 wherein said bundles are discrete, the wires in each bundle having ends at the other lateral side, said head comprising further connection wires extending across said other lateral side between respective ends, at said other lateral side, of wires in the bundle on the inside and wires in the bundle on the outside to complete the turns of a coil.

3. A magnetic transducing head as in claim 1 wherein said bundles each comprise a leg of a single U-shaped bundle of insulated wire.

4. A magnetic transducing head as in claim 1 wherein a bundle of insulated wires is bonded to the inside of each of said core limbs, a bundle of insulated wires is bonded to the outside of each of said core limbs, and connection wires extend across one lateral side of each limb between respective ends, at said one lateral side of each core limb, of wires in the bundle on the inside and wires in the bundle on the outside to complete the turns of a coil on each limb.

5. A magnetic transducing head as in claim 4 wherein said bundles are discrete, the wires in each bundle having ends at the other lateral side of the respective core limb, said head comprising further connection wires across each said other lateral side between respective ends, at said other lateral side of each core limb, of wires in the bundle on the inside and wires in the bundle on the outside to complete the turns of a coil on each limb.

6. A transducing head as in claim 1 wherein each bundle comprises layers of wires which parallel the transducing gap, adjacent wires of each subsequent layer being nested between adjacent wires of the preceding layer.

* * * * *